United States Patent
Xu et al.

(10) Patent No.: US 9,978,261 B2
(45) Date of Patent: May 22, 2018

(54) REMOTE CONTROLLER AND INFORMATION PROCESSING METHOD AND SYSTEM

(71) Applicant: Huawei Technologies Co., Ltd., Shenzhen (CN)

(72) Inventors: Lifu Xu, Shenzhen (CN); Shan Zhong, Shenzhen (CN); Zhaojie Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 14/493,520

(22) Filed: Sep. 23, 2014

(65) Prior Publication Data
US 2015/0054630 A1 Feb. 26, 2015

Related U.S. Application Data

(63) Continuation of application No. PCT/CN2013/082180, filed on Aug. 23, 2013.

(51) Int. Cl.
*G08C 17/02* (2006.01)
*G06F 3/0354* (2013.01)
(Continued)

(52) U.S. Cl.
CPC .......... *G08C 17/02* (2013.01); *G06F 1/163* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS

| 5,909,183 A | 6/1999 | Borgstahl et al. |
| 2003/0122804 A1 | 7/2003 | Yamazaki et al. |

(Continued)

FOREIGN PATENT DOCUMENTS

| CN | 1422400 A | 6/2003 |
| CN | 1525389 A | 9/2004 |

(Continued)

OTHER PUBLICATIONS

Partial English Translation and Abstract of Chinese Patent Application No. CN103197529, Feb. 19, 2016, 10 Sages.

(Continued)

*Primary Examiner* — Daniell L Negron
(74) *Attorney, Agent, or Firm* — Conley Rose, P.C.

(57) ABSTRACT

A remote controller and an information processing method and system, which relate to the field of electronic technologies and can improve user experience, where the remote controller is easy to carry. The remote controller includes a remote control main body, where the remote control main body is a wearable ring body; a sensor configured to detect a signal generated by an operation gesture input by a user; a processor, where the processor is connected to the sensor, and is configured to analyze the signal generated by the operation gesture, and generate a corresponding control signal according to an analysis result; and a first wireless communications module, connected to the processor, and configured to send the control signal to a terminal device, so that the terminal device performs a corresponding operation according to the control signal.

8 Claims, 8 Drawing Sheets

(51) Int. Cl.
*G06F 1/16* (2006.01)
*G06F 3/01* (2006.01)
*G06F 3/041* (2006.01)
*G06F 3/0346* (2013.01)

(52) U.S. Cl.
CPC .......... *G06F 3/03547* (2013.01); *G06F 3/041* (2013.01); *G06F 3/0416* (2013.01); *G06F 2203/0384* (2013.01); *G08C 2201/20* (2013.01); *G08C 2201/32* (2013.01); *G08C 2201/51* (2013.01)

(56) References Cited

U.S. PATENT DOCUMENTS

| | | | |
|---|---|---|---|
| 2005/0212911 | A1* | 9/2005 | Marvit .................. G06F 3/017 348/154 |
| 2009/0143877 | A1* | 6/2009 | Panje .................. G06F 1/1626 700/83 |
| 2009/0146198 | A1 | 6/2009 | Joe et al. |
| 2009/0303074 | A1 | 12/2009 | Lan |
| 2012/0025946 | A1 | 2/2012 | Chuang et al. |
| 2013/0173064 | A1* | 7/2013 | Fadell ............... G05D 23/1902 700/276 |

FOREIGN PATENT DOCUMENTS

| | | | |
|---|---|---|---|
| CN | 101459185 | A | 6/2009 |
| CN | 101600009 | A | 12/2009 |
| CN | 101819463 | A | 9/2010 |
| CN | 102023731 | A | 4/2011 |
| CN | 102681727 | A | 9/2012 |
| CN | 102737489 | A | 10/2012 |
| CN | 103076918 | A | 5/2013 |
| CN | 1013116973 | A | 5/2013 |
| CN | 103197529 | A | 7/2013 |
| CN | 203120084 | U | 8/2013 |
| CN | 103703495 | A | 4/2014 |
| JP | 2002358149 | A | 12/2002 |
| JP | 2003209399 | A | 7/2003 |
| JP | 2005217645 | A | 8/2005 |
| JP | 2010054293 | A | 3/2010 |
| JP | 2010204724 | A | 9/2010 |
| JP | 2010267220 | A | 11/2010 |
| JP | 2010537302 | A | 12/2010 |
| KR | 20100072198 | A | 6/2010 |
| WO | 2009024971 | A2 | 2/2009 |
| WO | 2012099428 | A2 | 7/2012 |

OTHER PUBLICATIONS

Partial English Translation and Abstract of Chinese Patent Application No. CN103076918, Feb. 19, 2016, 11 pages.
Foreign Communication From a Counterpart Application, Chinese Application No. 201380001602.2, Dec. 30, 2015, 13 pages.
Partial English Translation and Abstract of Chinese Patent Application No. CN101819463A, Sep. 12, 2014, 7 pages.
Partial English Translation and Abstract of Chinese Patent Application No. CN102023731A, Sep. 12, 2014, 17 pages.
Partial English Translation and Abstract of Chinese Patent Application No. CN102681727A, Sep. 12, 2014, 39 pages.
Partial English Translation and Abstract of Chinese Patent Application No. CN103703495, Sep. 12, 2014, 16 pages.
Foreign Communication From a Counterpart Application, PCT Application No. PCT/CN2013/082180, International Search Report dated May 30, 2014, 7 pages.
Foreign Communication From a Counterpart Application, PCT Application No. PCT/CN2013/082180, Written Opinion dated May 30, 2014, 6 pages.
Partial English Translation and Abstract of Chinese Patent Application No. CN1525389, Oct. 10, 2016, 9 pages.
Foreign Communication From a Counterpart Application, European Application No. 13891790.1, Extended European Search Report dated Aug. 25, 2016, 8 pages.
Machine Translation and Abstract of Japanese Publication No. JP2003209399, Jul. 25, 2003, 29 pages.
Machine Translation and Abstract of Japanese Publication No. JP2005217645, Aug. 11, 2005, 32 pages.
Machine Translation and Abstract of Japanese Publication No. JP201054293, Mar. 11, 2010, 23 pages.
Machine Translation and Abstract of Japanese Publication No. JP2010204724, Sep. 16, 2010, 34 pages.
Machine Translation and Abstract of Japanese Publication No. JP2010267220, Nov. 25, 2010, 23 pages.
Foreign Communication From a Counterpart Application, Japanese Application No. 2016528291, Japanese Office Action dated Feb. 21, 2017, 5 pages.
Foreign Communication From a Counterpart Application, Japanese Application No. 2016528291, English Translation of Japanese Office Action dated Feb. 21, 2017, 6 pages.
Foreign Communication From a Counterpart Application, Korean Application No. 10-2015-7035139, Korean Office Action dated Jan. 22, 2017, 6 pages.
Foreign Communication From a Counterpart Application, Korean Application No. 10-2015-7035139, English Translation of Korean Office Action dated Jan. 22, 2017, 5 pages.

* cited by examiner

REMOTE CONTROLLER AND INFORMATION PROCESSING METHOD AND SYSTEM

CROSS-REFERENCE TO RELATED APPLICATIONS

This application is a continuation of International Application No. PCT/CN2013/082180, filed on Aug. 23, 2013, which is hereby incorporated by reference in its entirety.

TECHNICAL FIELD

The present invention relates to the field of electronic technologies, and in particular, to a remote controller and an information processing method and system.

BACKGROUND

A remote controller is an apparatus for remotely controlling a terminal device. Current remote controllers are mainly pushbutton remote controllers on which multiple convex pushbuttons are arranged. A user may hold a pushbutton remote controller with a hand, and control, by pressing different pushbuttons, a terminal device to execute corresponding response instructions. However, the pushbutton remote controller requires the user to control the terminal device by an action such as clicking or pressing and holding a pushbutton, and is not easy to carry. Therefore, when the pushbutton remote controller is used, user experience is relatively poor.

SUMMARY

Embodiments of the present invention provide a remote controller and an information processing method and system, which can improve user experience, where the remote controller is easy to carry.

To achieve the foregoing objectives, the embodiments of the present invention use the following technical solutions:

According to a first aspect, a remote controller is provided, including a remote control main body, where the remote control main body is a wearable ring body; a sensor configured to detect a signal generated by an operation gesture input by a user; a processor, where the processor is connected to the sensor, and is configured to analyze the signal generated by the operation gesture, and generate a corresponding control signal according to an analysis result; and a first wireless communications module, connected to the processor, and configured to send the control signal to a terminal device, so that the terminal device performs a corresponding operation according to the control signal.

With reference to the first aspect, in a first possible implementation manner, the sensor includes a touch pad, where the touch pad is located on an outer surface of the remote control main body, and is configured to receive a touch gesture input by the user, where the touch gesture is one of the operation gestures; and/or, an acceleration sensor, where the acceleration sensor is configured to convert an acceleration, which is generated when the user shakes the remote controller, to a voltage output signal; and/or, a first sensor, where the first sensor is located on an inner surface of the remote control main body, and is configured to detect a movement direction and a movement distance in the movement direction when the remote controller moves.

With reference to the first possible implementation manner, in a second possible implementation manner, the processor is further configured to when the operation gesture received by the touch pad is a gesture indicating pairing, activate a first near field communication (NFC) module, so that the first NFC module establishes a connection to and communicates with a second NFC module of the terminal device within a preset time threshold, where a distance between the first NFC module and the second NFC module is within a specific distance range; and the first wireless communications module is further configured to establish a connection between the first wireless communications module of the remote controller and a second wireless communications module of the terminal device by means of communication between the first NFC module and the second NFC module, where the connection between the first wireless communications module of the remote controller and the second wireless communications module of the terminal device is a Wireless Fidelity (WIFI) or Bluetooth connection.

With reference to the second possible implementation manner, in a third possible implementation manner, the first wireless communications module is further configured to send a first operation instruction table to the second wireless communications module, so that the terminal device updates an operation instruction table in the terminal device according to the first operation instruction table, where the first operation instruction table records relationships between operation gestures and response instructions; the processor is configured to generate, according to the signal generated by the operation gesture input by the user, a control signal indicating the operation gesture; and the first wireless communications module is configured to send the control signal to the terminal device, so that the terminal device queries the first operation instruction table according to the operation gesture indicated by the control signal, and executes, according to a query result, a response instruction corresponding to the operation gesture.

With reference to the second possible implementation manner, in a fourth possible implementation manner, the first wireless communications module is further configured to receive a second operation instruction table sent by the second wireless communications module; the first wireless communications module is further configured to update an operation instruction table in the remote controller according to the second operation instruction table, where the second operation instruction table records relationships between control signals and response instructions; the processor is configured to query the second operation instruction table according to the operation gesture, and generate a control signal that carries a response instruction corresponding to the operation gesture; and the first wireless communications module is configured to send the control signal to the terminal device, so that the terminal device executes the response instruction carried in the control signal.

With reference to the first to the fourth possible implementation manners, in a fifth possible implementation manner, the operation gesture includes a gesture of touching and holding after sliding, a gesture of covering, a gesture of covering and rotating, a gesture of covering and translation, or a gesture of holding after covering and rotating.

With reference to the fifth possible implementation manner, in a sixth possible implementation manner, the processor is configured to receive touch point information reported by the touch pad, where touch points are continuous; record start position coordinates and end position coordinates of the operation gesture; record an operation residence time of the user at the end position coordinates; and when a distance between the start position coordinates and the end position coordinates is larger than or equal to a first preset distance, and the operation residence time is longer than or equal to a first time threshold, determine that the operation gesture is the gesture of touching and holding after sliding.

With reference to the fifth possible implementation manner, in a seventh possible implementation manner, the processor is configured to obtain a touch area detected by the touch pad and generated by a user operation; obtain a spacing between two points, between which an annular distance is the largest, in the touch area as a first length; and obtain a spacing between two points, between which an axial distance is the largest, in the touch area as a second length.

With reference to the seventh possible implementation manner, in an eighth possible implementation manner, the processor is configured to when a movement distance of the remote controller in a first movement direction is smaller than a first preset movement distance and a movement distance in a second movement direction is smaller than a second preset movement distance, and the first length is larger than or equal to a first preset length and the second length is larger than or equal to a second preset length, determine that the operation gesture is the gesture of covering, where the first movement direction is parallel to a circumferential direction of the ring body, and the second movement direction is parallel to an axis direction of the remote control main body.

With reference to the seventh possible implementation manner, in a ninth possible implementation manner, the processor is configured to when a movement distance of the remote controller in a first movement direction is larger than or equal to a first preset movement distance, and a movement time is shorter than a first preset movement time, and at the same time, an operation residence time of the user at a movement end position is shorter than or equal to a second time threshold, the first length is larger than or equal to a first preset length, and the second length is larger than or equal to a second preset length, determine that the operation gesture is the gesture of covering and rotating, where the first movement direction is parallel to a circumferential direction of the ring body.

With reference to the seventh possible implementation manner, in a tenth possible implementation manner, the processor is configured to when a movement distance of the remote controller in a second movement direction is larger than or equal to a second preset movement distance, and a movement time is shorter than a second preset movement time, and at the same time, an operation residence time of the user at a movement end position is shorter than or equal to a second time threshold, the first length is larger than or equal to a first preset length, and the second length is larger than or equal to a second preset length, determine that the operation gesture is the gesture of covering and translation, where the second movement direction is parallel to an axis direction of the remote control main body.

With reference to the seventh possible implementation manner, in an eleventh possible implementation manner, the processor is configured to when a movement distance of the remote controller in a first movement direction is larger than or equal to a first preset movement distance, and a movement time is shorter than a first preset movement time, and at the same time, an operation residence time of the user at a movement end position is longer than a second time threshold, the first length is larger than or equal to a first preset length, and the second length is larger than or equal to a second preset length, determine that the operation gesture is the gesture of holding after covering and rotating, where the first movement direction is parallel to a circumferential direction of the ring body.

With reference to the first aspect and the first to the eleventh possible implementation manners, in a twelfth possible implementation manner, the remote controller further includes a microphone, where the microphone is located on the outer surface of the remote control main body, and is configured to receive an external voice input.

With reference to the first aspect and the first to the twelfth possible implementation manners, in a thirteenth possible implementation manner, the remote controller further includes an indicator light, where the indicator light is located on the outer surface of the remote control main body, and is configured to provide indication signals of different colors for the user.

According to a second aspect, an information processing method is provided, applied to the foregoing remote controller, and including receiving a signal generated by an operation gesture input by a user, where the operation gesture includes a gesture of touching and holding after sliding, a gesture of covering, a gesture of covering and rotating, a gesture of covering and translation, or a gesture of holding after covering and rotating; analyzing the signal generated by the operation gesture; generating a control signal according to an analysis result; and sending the control signal to a terminal device, so that the terminal device performs a corresponding operation according to the control signal.

With reference to the second aspect, in a first possible implementation manner, before the receiving a signal generated by an operation gesture input by a user, the method further includes receiving an operation gesture indicating pairing; activating a first NFC module of the remote controller; within a preset time threshold, when a distance between the first NFC module and a second NFC module of the terminal device is shortened to be within a specific distance range, establishing, by the first NFC module, a connection to and communicating with the second NFC module; and establishing a connection between a first wireless communications module of the remote controller and a second wireless communications module of the terminal device by means of communication between the first NFC module and the second NFC module, where the connection between the first wireless communications module of the remote controller and the second wireless communications module of the terminal device is a WIFI or Bluetooth connection.

With reference to the first possible implementation manner, in a second possible implementation manner, the control signal includes the operation gesture, after the establishing a connection between a first wireless communications module of the remote controller and a second wireless communications module of the terminal device by means of communication between the first NFC module and the second NFC module, the method further includes sending a first operation instruction table to the terminal device, so that the terminal device updates an operation instruction table in the terminal device according to the first operation instruction table, where the first operation instruction table records relationships between operation gestures and response instructions; and the sending the control signal to a terminal device, so that the terminal device performs a corresponding operation according to the control signal includes sending the control signal to the terminal device, so that the terminal device queries the first operation instruction table according to the operation gesture indicated by the control signal, and executes a corresponding response instruction according to a query result.

With reference to the first possible implementation manner, in a third possible implementation manner, after the establishing a connection between a first wireless communications module of the remote controller and a second wireless communications module of the terminal device by means of communication between the first NFC module and the second NFC module, the method further includes receiving a second operation instruction table sent by the second wireless communications module; and updating an operation instruction table in the remote controller according to the second operation instruction table, where the second operation instruction table records relationships between control signals and response instructions; and the sending the control signal to a terminal device, so that the terminal device performs a corresponding operation according to the control signal includes sending the control signal to the terminal device, so that the terminal device executes the response instruction carried in the control signal.

With reference to the second aspect and the first to the third possible implementation manners, in a fourth possible implementation manner, the analyzing the operation gesture includes receiving touch point information reported by the touch pad, where touch points are continuous; recording start position coordinates and end position coordinates of the operation gesture; recording an operation residence time of the user at the end position coordinates; and when a distance between the start position coordinates and the end position coordinates is larger than or equal to a first preset distance, and the operation residence time is longer than or equal to a first time threshold, determining that the operation gesture is the gesture of touching and holding after sliding.

With reference to the second aspect and the first to the fourth possible implementation manners, in a fifth possible implementation manner, the analyzing the operation gesture includes obtaining a touch area detected by the touch pad and generated by a user operation; obtaining a spacing between two points, between which an annular distance is the largest, in the touch area as a first length; and obtaining a spacing between two points, between which an axial distance is the largest, in the touch area as a second length.

With reference to the fifth possible implementation manner, in a sixth possible implementation manner, the analyzing the operation gesture further includes when a movement distance of the remote controller in a first movement direction is smaller than a first preset movement distance and a movement distance in a second movement direction is smaller than a second preset movement distance, and the first length is larger than or equal to a first preset length and the second length is larger than or equal to a second preset length, determining that the operation gesture is the gesture of covering, where the first movement direction is parallel to a circumferential direction of the ring body, and the second movement direction is parallel to an axis direction of the remote control main body.

With reference to the fifth possible implementation manner, in a seventh possible implementation manner, the analyzing the operation gesture further includes when a movement distance of the remote controller in a first movement direction is larger than or equal to a first preset movement distance, and a movement time is shorter than a first preset movement time, and at the same time, an operation residence time of the user at a movement end position is shorter than or equal to a second time threshold, the first length is larger than or equal to a first preset length, and the second length is larger than or equal to a second preset length, determining that the operation gesture is the gesture of covering and rotating, where the first movement direction is parallel to a circumferential direction of the ring body.

With reference to the fifth possible implementation manner, in an eighth possible implementation manner, the analyzing the operation gesture further includes when a movement distance of the remote controller in a second movement direction is larger than or equal to a second preset movement distance, and a movement time is shorter than a second preset movement time, and at the same time, an operation residence time of the user at a movement end position is shorter than or equal to a second time threshold, the first length is larger than or equal to a first preset length, and the second length is larger than or equal to a second preset length, determining that the operation gesture is the gesture of covering and translation, where the second movement direction is parallel to an axis direction of the remote control main body.

With reference to the fifth possible implementation manner, in a ninth possible implementation manner, the analyzing the operation gesture further includes when a movement distance of the remote controller in a first movement direction is larger than or equal to a first preset movement distance, and a movement time is shorter than a first preset movement time, and at the same time, an operation residence time of the user at a movement end position is longer than a second time threshold, the first length is larger than or equal to a first preset length, and the second length is larger than or equal to a second preset length, determining that the operation gesture is the gesture of holding after covering and rotating, where the first movement direction is parallel to a circumferential direction of the ring body.

According to a third aspect, an information processing system is provided, including any remote controller described above and a terminal device, where the terminal device is configured to perform a corresponding operation according to a control instruction sent by the remote controller.

With reference to the third aspect, in a first possible implementation manner, the terminal device is a mobile phone, a television set, or a computer.

The embodiments of the present invention provide a remote controller and an information processing method and system, where the remote controller includes a remote control main body, where the remote control main body is a wearable ring body; a sensor configured to detect a signal generated by an operation gesture input by a user; a processor, where the processor is connected to the sensor, and is configured to analyze the signal generated by the operation gesture, and generate a corresponding control signal according to an analysis result; and a first wireless communications module, connected to the processor, and configured to send the control signal to a terminal device, so that the terminal device performs a corresponding operation according to the control signal. In this way, because the remote control main body is a wearable ring body, the remote controller can be worn on the body of a user; moreover, the user controls, by inputting an operation gesture to the sensor, the remote controller to send a control signal to a terminal device, and neither a pushbutton operation nor a large-amplitude hand action is required. Therefore, the remote controller can improve user experience and is easy to carry.

BRIEF DESCRIPTION OF DRAWINGS

To describe the technical solutions in the embodiments of the present invention more clearly, the following briefly introduces accompanying drawings required for describing the embodiments.

DESCRIPTION OF EMBODIMENTS

The following clearly describes technical solutions in embodiments of the present invention with reference to accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within a protection scope of the present invention.

In the present invention, the term "and/or" only describes an association relationship between associated objects, and indicates that three relationships may exist. For example, A and/or B may indicate three cases: only A exists; both A and B exist; and only B exists. In addition, in this document, the symbol "/" generally indicates that the associated objects before and after the symbol are in an "or" relationship.

Figure 1:
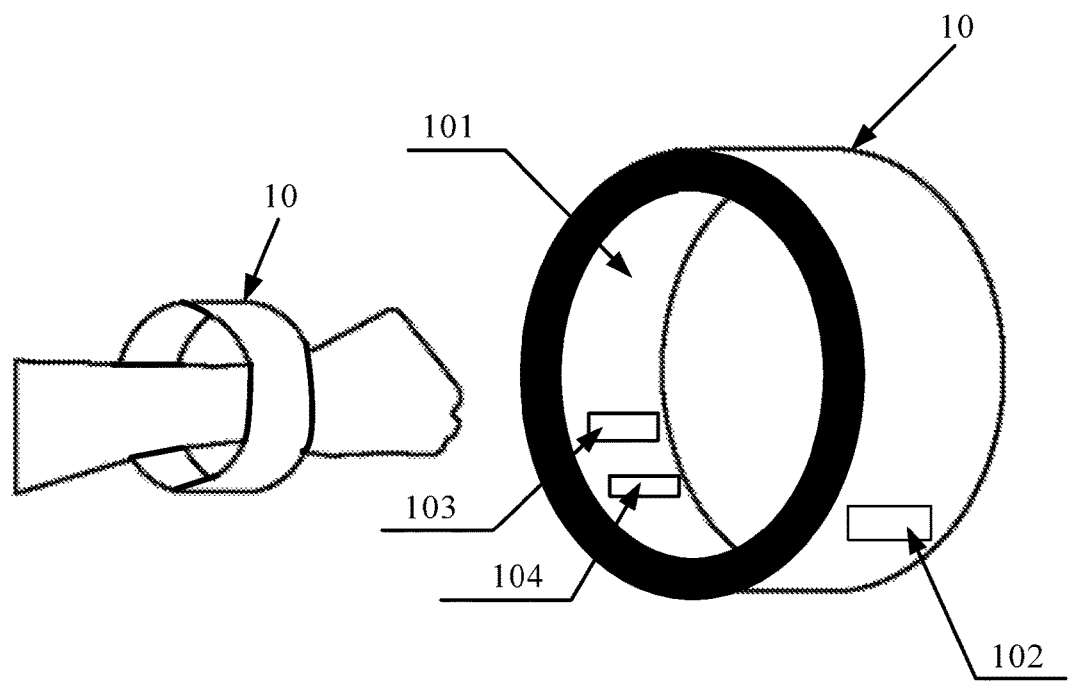
FIG. 1 is a schematic structural diagram of a remote controller according to an embodiment of the present invention.
Figure 2:
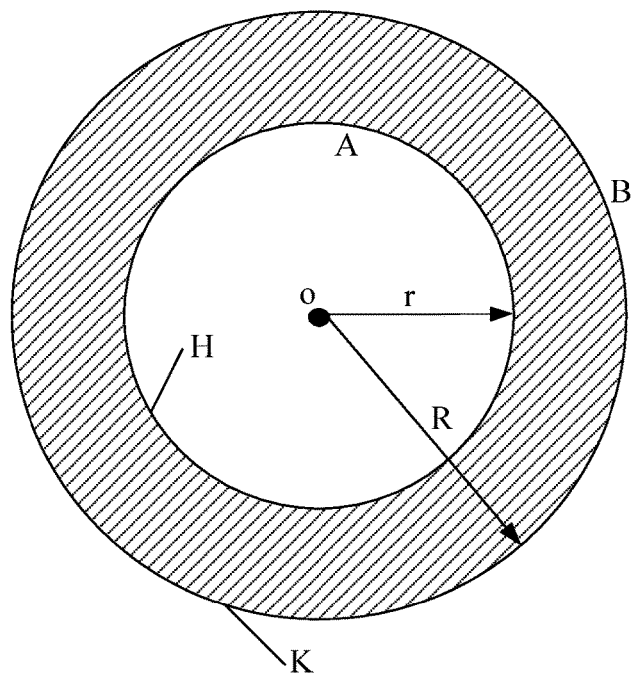
FIG. 2 is a diagram of an annular axis section of a remote control main body of a remote controller according to an embodiment of the present invention.

As shown in FIG. 1, an embodiment of the present invention provides a remote controller 10, including a remote control main body 101, where the remote control main body 101 is a wearable ring body, the ring body may be enclosed or not enclosed, and the remote control main body 101 may be worn around a body part such as a waist or a wrist, for example, the remote control main body 101 in FIG. 1 is worn around a wrist; the ring body mentioned in the embodiment of the present invention may be bangle-shaped, including an inner surface and an outer surface, and may also be a cylindrical hollow barrel-shaped body, including an inner surface, an outer surface, and an upper bottom surface and a lower bottom surface; an annular axis section of the ring body may be that shown in FIG. 2, and in the annular axis section, the slash part is solid, and the blank part, that is, the part of a circle A is hollow, and the body part such as the wrist can pass through this blank part to wear the remote control main body 101; the circle A and a circle B may have a common circle center o, and a radius r of the circle A is shorter than a radius R of the circle B; a curved surface H on which a curve of the circle A, whose boundary orientates toward the inside of the circle A, is located is the inner surface of the remote control main body, and a curved surface K on which a curve of the circle B, whose boundary orientates toward the outside of the circle B is located, is the outer surface of the remote control main body; and the inner surface of the remote control main body 101 may contact the body of a user; a sensor 102 configured to detect a signal generated by an operation gesture input by the user; a processor 103, where the processor is connected to the sensor 102, and is configured to analyze the signal generated by the operation gesture, and generate a corresponding control signal according to an analysis result; and a first wireless communications module 104, connected to the processor 103, and configured to send the control signal to a terminal device, so that the terminal device performs a corresponding operation according to the control signal. The terminal device may be a device such as a mobile phone, a television set, or a computer.

Particularly, in FIG. 1, shapes and positions of the sensor 102, the processor 103, and the first wireless communications module 104 are merely examples for description; and in an actual application, the sensor 102, the processor 103, and the first wireless communications module 104 may be located on the outer surface of the remote control main body 101, or located on the inner surface of the remote control main body 101, or embedded into the remote control main body 101.

In this way, because the remote control main body 101 is a wearable ring body, the remote controller can be worn on the body of a user; moreover, the user controls, by inputting an operation gesture to the sensor 102, the remote controller to send a control signal to a terminal device, and no pushbutton operation is required. Therefore, the remote controller can improve user experience and is easy to carry.

Figure 3:
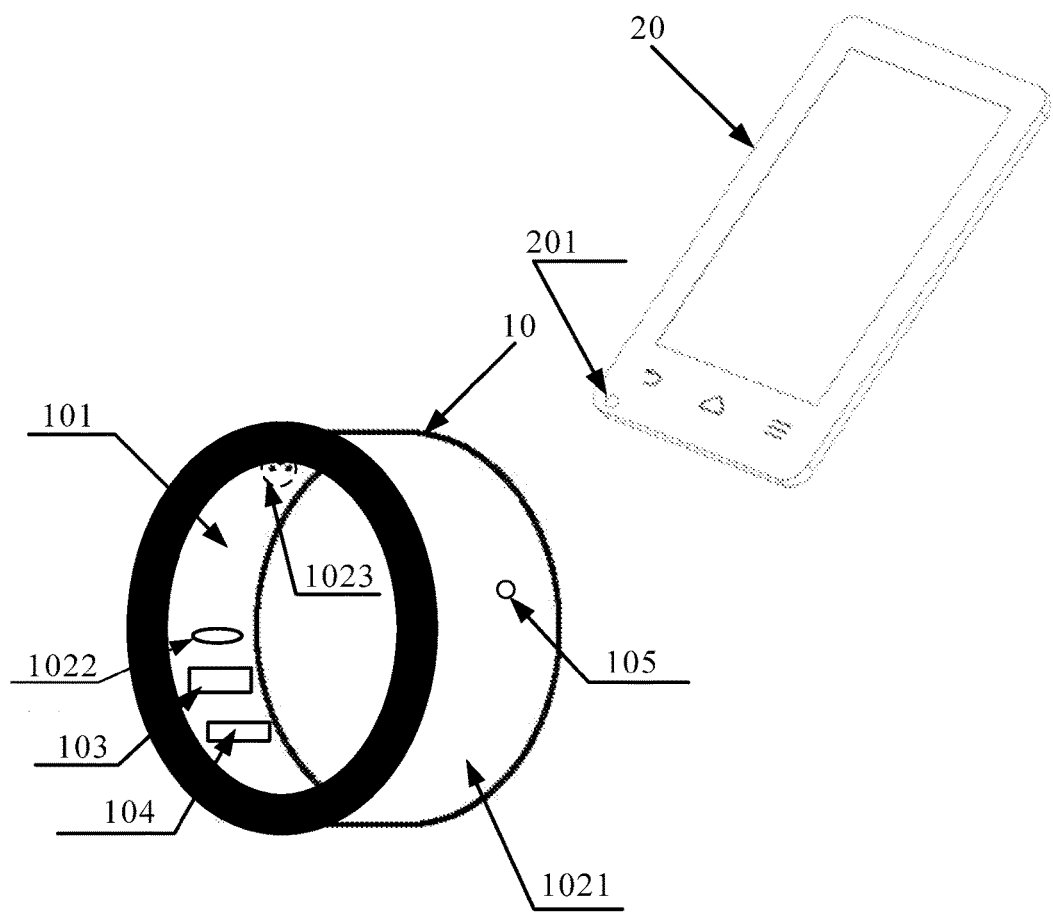
FIG. 3 is a schematic structural diagram of a sensor according to an embodiment of the present invention.

Further, as shown in FIG. 3, the sensor 102 may include a touch pad 1021, where the touch pad 1021 is located on the outer surface of the remote control main body 101; may cover the outer surface of the remote control main body 101, or may be embedded into the outer surface of the remote control main body 101; and is configured to receive a touch gesture input by the user, where the touch gesture is one of the operation gestures; and/or, an acceleration sensor 1022, where the acceleration sensor 1022 is configured to convert an acceleration, which is generated when the user shakes the remote controller 10, to a voltage output signal, and the acceleration sensor 1022 may be connected to the processor 103, so that the processor 103 analyzes the voltage output signal to obtain the acceleration and a direction of shaking the remote controller 10; and/or, a first sensor 1023, where the first sensor 1023 may be located on the inner surface of the remote control main body 101, and is configured to detect a movement direction and a movement distance in the movement direction when the remote controller 10 moves, and output a detection result to the processor 103. The first sensor 1023 may be formed by a light emitting diode, an optical lens component, an optical sensor, an image processing chip, and so on, which is similar to an induction principle of an optical mouse. The light emitting diode may continuously emit light to an area such as skin on the wrist, which can be contacted by the inner surface of the ring-shaped remote controller, on the body of the user, so that the light is reflected by the contactable area to the optical sensor through the optical lens component, the optical sensor converts a light signal to an electrical signal and sends the electrical signal to the image processing chip, and the image processing chip processes the electrical signal and outputs the movement direction of the remote controller and the movement distance in the movement direction to the processor. The first sensor may also be one of other multiple sensors configured to detect the movement direction and the movement distance, which is not limited in the present invention. The remote controller further includes a first NFC module 105, which is configured to perform NFC communication with another device with an NFC function.

The processor 103 may be further configured to when the operation gesture received by the touch pad 1021 is a gesture indicating pairing, activate a first NFC module 105, so that the first NFC module 105 establishes a connection to and communicates with a second NFC module 201 of the terminal device 20 within a preset time threshold, where a distance between the first NFC module 105 and the second NFC module 201 is within a specific distance range, and the specific distance range is generally 0 to 10 centimeters (cm).

It should be noted that, the first NFC module 105 can establish a connection with the second NFC module 201 of the terminal device 20 when the distance between the first NFC module 105 and the second NFC module 201 of the terminal device 20 is within the specific distance range. In FIG. 3, an example is used, in which the terminal device 20 is a mobile phone.

The first wireless communications module 104 is further configured to establish a connection between the first wireless communications module 104 of the remote controller 10 and a second wireless communications module (not shown in FIG. 3) of the terminal device 20 by means of communication between the first NFC module 105 and the second NFC module 201, where the connection between the first wireless communications module 104 of the remote controller 10 and the second wireless communications module of the terminal device is a WIFI or Bluetooth connection. Further, after the connection is established between the first NFC module 105 and the second NFC module 201, relevant information of the first wireless communications module 104 and the second wireless communications module may be transmitted through the connection, and pairing may be performed on communications links of the first wireless communications module 104 and the second wireless communications module according to the relevant information, where the first wireless communications module 104 and the second wireless communications module may be Bluetooth communications modules or WIFI modules, and so on. After the pairing of the communications links succeeds, a wireless connection is established between the first wireless communications module 104 and the second wireless communications module. After the wireless connection is established between the first wireless communications module 104 and the second wireless communications module, the two modules can communicate with each other, and the first wireless communications module 104 can control, by sending the control signal to the second wireless communications module, the terminal device 20 to perform the corresponding operation.

In the embodiment of the present invention, after a gesture indicating pairing is received, pairing connection is performed between the first NFC module 105 and the second NFC module 201; and if an operation gesture indicating pairing of a user is not received, even if a distance between the first NFC module 105 and the second NFC module 201 is shortened to be within a specific distance range, connection cannot be performed because the first NFC module 105 is not activated. Therefore, misconnections caused by unintended touch by the user are effectively reduced. Moreover, as long as the second NFC module 201 is provided in a terminal device, a user can connect the remote controller to the terminal device 20 by means of pairing connection, so as to control the terminal device 20. Therefore, the remote controller can control multiple terminal devices, for example, a mobile phone, a portable computer, a palmtop computer, and so on.

It should be noted that, after the connection is established between the first wireless communications module 104 and the second wireless communications module, a screen of the terminal device 20 may display that the connection succeeds, to remind the user that the connection has succeeded.

Further, after the wireless connection is established between the first wireless communications module 104 and the second wireless communications module, the first wireless communications module 104 may be further configured to send a first operation instruction table to the second wireless communications module, so that the terminal device 20 updates an operation instruction table in the terminal device 20 according to the first operation instruction table, where the first operation instruction table records correspondences between operation gestures and response instructions, for example, an operation gesture is a tap gesture, and a corresponding response instruction is to open a file. The processor is configured to generate, according to the signal generated by the operation gesture input by the user, a control signal indicating the operation gesture, that is, the processor determines a specific operation gesture according to the detected signal generated by the operation gesture, and generates, according to the operation gesture, a control signal indicating the operation gesture. The first wireless communications module 104 is configured to send the control signal to the terminal device 20, so that the terminal device 20 queries the first operation instruction table according to the operation gesture indicated by the control signal, and executes a corresponding response instruction according to a query result. Because the terminal device updates a mapping table to the first operation instruction table, in an actual application, the control signal may include only the operation gesture, which reduces the process of processing the operation gesture by the processor, and simplifies the process of controlling the terminal device by the remote controller.

The first wireless communications module 104 may be further configured to receive a second operation instruction table sent by the second wireless communications module. The first wireless communications module 104 is further configured to update an operation instruction table in the remote controller according to the second operation instruction table, where the second operation instruction table records relationships between control signals and response instructions, for example, a control signal is a first control signal, and a corresponding response instruction is to open a file. The processor is configured to query the second operation instruction table according to the operation gesture, and generate a control signal that carries a response instruction corresponding to the operation gesture, where, the processor may analyze the signal detected by the sensor and generated by the operation gesture input by the user, query the second operation instruction table according to an analysis result, to obtain a response instruction corresponding to the operation gesture, and generate the control signal that carries the response instruction. The first wireless communications module 104 is configured to send the control signal to the terminal device 20, so that the terminal device 20 executes the response instruction carried in the control signal. In this way, by updating the operation instruction table to the second operation instruction table, the remote controller can be connected to multiple terminal devices, which expands a scope in which the remote controller can be used.

Particularly, after executing the corresponding operation, the terminal device 20 may send a feedback signal to the remote controller through the established wireless connection, where the feedback signal indicates that the operation succeeds or the operation fails. The processor 103 may control, according to the feedback signal, a corresponding module in the remote controller 10 to send a sound signal or a color signal to remind the user.

It should be noted that the operation gesture may include the tap gesture, a gesture of touching and holding, a double-tap gesture, a triple-tap gesture, a slide gesture, a gesture of touching and holding after sliding, a drag gesture, a gesture with two fingers, a gesture of covering, a gesture of covering and rotating, a gesture of covering and translation, or a gesture of holding after covering and rotating, and so on. The tap gesture, the gesture of touching and holding, the double-tap gesture, the triple-tap gesture, the slide gesture, the drag gesture, and the gesture with two fingers are touch gestures, and are mainly detected using a touch pad, which is the same as that in the prior art, and no details are provided in the present invention. Operations for the operation gesture involve small-amplitude actions and are easy to learn; and the user controls the terminal device using a simple operation gesture only without pressing different pushbuttons. Therefore, user experience can be improved.

Figure 4:
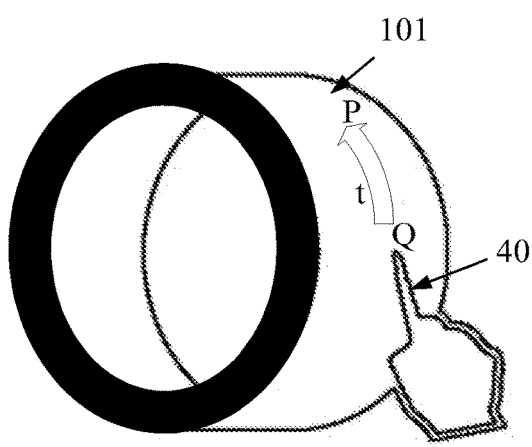
FIG. 4 is a schematic diagram of a gesture of touching and holding after sliding according to an embodiment of the present invention.

When the operation gesture is the gesture of touching and holding after sliding, as shown in FIG. 4, a finger 40 slides starting from a point Q in a direction of an arrow t to a point P, and stays for a certain period of time at the point P. It should be noted that, the arrow t is located on the outer surface of the remote control main body 101, and therefore is a curved arrow; the arrow t indicates a sliding track and a sliding direction of the finger 40 on the touch pad (not shown in FIG. 4), and the direction of the arrow t in FIG. 4 is merely exemplary for description; and in an actual application, the arrow t may indicate any direction, which is not limited in the present invention.

At this time, the processor 103 is configured to determine, according to touch point information reported by the touch pad and according to the fact that touch points are continuous, that the operation gesture is sliding, and record start position coordinates and end position coordinates of the operation gesture, that is, position coordinates of the point Q and the point P in FIG. 4; record an operation residence time of the user at the end position coordinates, that is, the operation residence time at the point P; and when a distance between the start position coordinates and the end position coordinates is larger than or equal to a first preset distance, and the operation residence time is longer than or equal to a first time threshold, determine that the operation gesture is the gesture of touching and holding after sliding.

Figure 5:
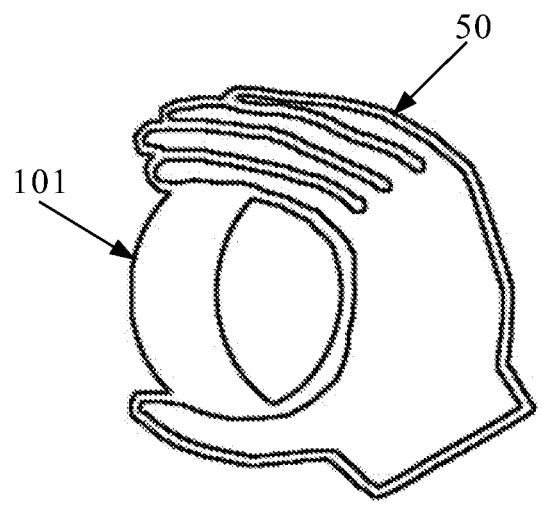
FIG. 5 is a schematic diagram of a gesture of covering according to an embodiment of the present invention.

When the operation gesture is the gesture of covering, as shown in FIG. 5, a hand 50 of the user covers the outer surface of the remote control main body 101, where the fingers and palm cover the outer surface along a bending direction of the outer surface of the remote control main body 101, and touch the touch pad as much as possible.

Figure 6:
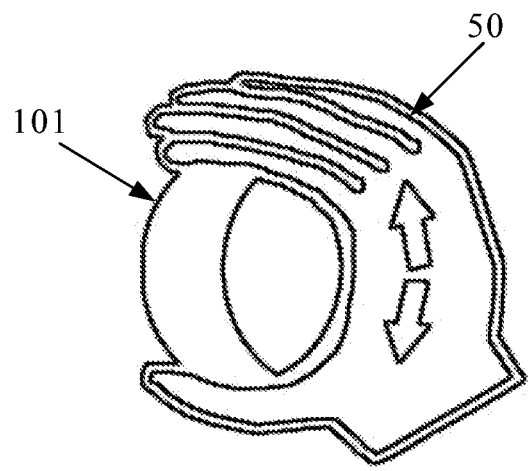
FIG. 6 is a schematic diagram of a gesture of covering and rotating or a gesture of holding after covering and rotating according to an embodiment of the present invention.

When the operation gesture is the gesture of covering and rotating, as shown in FIG. 6, the hand 50 of the user covers the outer surface of the remote control main body 101, where the fingers and palm cover along the bending direction of the outer surface of the remote control main body 101, and touch the touch pad as much as possible; and then rotate in an annular direction of the remote control main body 101, for example, rotate in a direction of an arrow in FIG. 6, or first rotate in a direction of an arrow, and then rotate in a direction of another arrow. After the rotation ends, the hand 50 of the user immediately leaves the outer surface of the remote control main body 101.

Figure 7:
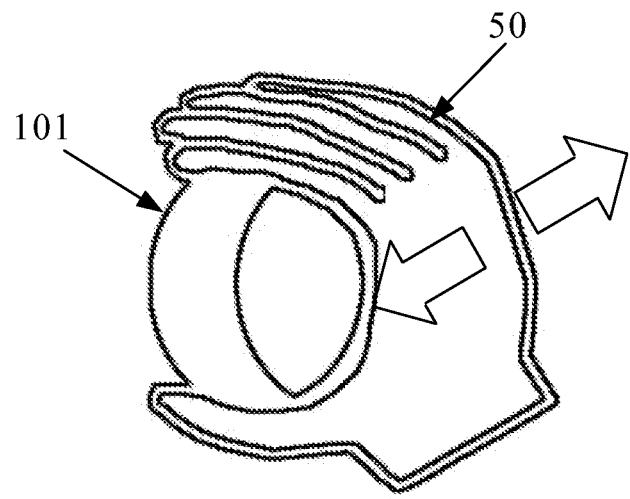
FIG. 7 is a schematic diagram of a gesture of covering and translation according to an embodiment of the present invention.

When the operation gesture is the gesture of covering and translation, as shown in FIG. 7, the hand 50 of the user covers the outer surface of the remote control main body 101, where the fingers and palm cover along the bending direction of the outer surface of the remote control main body 101, and touch the touch pad as much as possible; and then the fingers and palm hold the remote control main body 101 and perform translation in an axial direction of the remote control main body 101, for example, perform translation in a direction of an arrow in FIG. 7, or first move in a direction of an arrow, and then perform translation in a direction of another arrow. After the translation ends, the hand 50 of the user immediately leaves the outer surface of the remote control main body 101. When the remote controller is worn around an arm of the user, the arrow direction in FIG. 7 is parallel to the arm of the user.

When the operation gesture is the gesture of holding after covering and rotating, as shown in FIG. 6, the hand 50 of the user covers the outer surface of the remote control main body 101, where the fingers and palm cover along the bending direction of the outer surface of the remote control main body 101, and touch the touch pad as much as possible; and then rotate in the annular direction of the remote control main body 101, for example, rotate in a direction of an arrow in FIG. 6, or first rotate in a direction of an arrow, and then rotate in a direction of another arrow. After the rotation ends, the hand 50 of the user stays for a period of time on the outer surface of the remote control main body 101.

Figure 8:
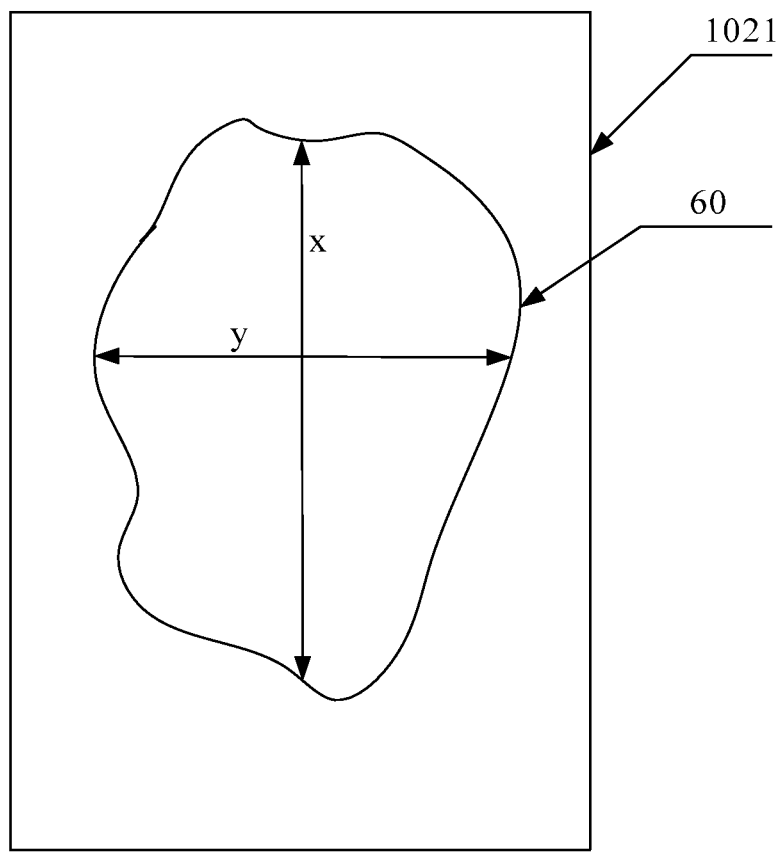
FIG. 8 is a schematic diagram of a touch area according to an embodiment of the present invention.

The processor 103 is configured to first obtain a touch area detected by the touch pad and generated by a user operation, and then analyze the touch area generated on the touch pad by the user operation. It is assumed that, after being unfolded, the touch pad 1021 takes on a rectangle shown in FIG. 8, and after being unfolded, a touch area 60 is an irregular area shown in FIG. 8. The processor 103 may obtain a spacing between two points, between which an annular distance is the largest, in the touch area 60 as a first length x; and obtain a spacing between two points, between which an axial distance is the largest, in the touch area 60 as a second length y. Then, the processor 103 determines whether the remote controller moves or not, where the movement includes rotation movement and translation movement. When a movement distance of the remote controller in a first movement direction is smaller than a first preset movement distance and a movement distance in a second movement direction is smaller than a second preset movement distance, and the first length x is larger than or equal to a first preset length and the second length y is larger than or equal to a second preset length, it is determined that the operation gesture is the gesture of covering, where the first movement direction is parallel to a circumferential direction of the ring body, and the second movement direction is parallel to an axis direction of the remote control main body.

It should be noted that, before the first length x and the second length y are obtained, shape approximating processing may further be performed on the touch area 60 first, to approximate the touch area 60 to a shape such as a rectangle or an ellipse, so as to simplify the process of obtaining the first length x and the second length y. It should be noted that, whether the remote controller moves or not may be determined according to a signal generated by the first sensor 1023.

When the movement distance of the remote controller in the first movement direction is larger than or equal to the first preset movement distance, and a movement time is shorter than a first preset movement time, and at the same time, an operation residence time of the user at a movement end position is shorter than or equal to a second time threshold, the first length is larger than or equal to the first preset length, and the second length is larger than or equal to the second preset length, it is determined that the operation gesture is the gesture of covering and rotating, where the first movement direction (that is, the annular direction) is parallel to the circumferential direction of the ring body.

When the movement distance of the remote controller in the second movement direction is larger than or equal to the second preset movement distance, and the movement time is shorter than a second preset movement time, and at the same time, the operation residence time of the user at the movement end position is shorter than or equal to the second time threshold, the first length is larger than or equal to the first preset length, and the second length is larger than or equal to the second preset length, it is determined that the operation gesture is the gesture of covering and translation, where the second movement direction (that is, the axial direction) is parallel to the axis direction of the remote control main body.

It should be noted that the first preset movement distance may be equal or unequal to the second preset movement distance, which is not limited in the present invention. The second movement direction may be parallel to the axial direction of the remote control main body, and the first preset movement time and the second preset movement time are set to determine that the remote controller is being operated by a user. Movement in a specified direction, within a specified period of time, and within a specified distance range is determined, and it is avoided that movement caused by the user by doing exercises such as dancing and running is determined, thereby reducing misoperations. The first preset movement time may be equal or unequal to the second preset movement time, which is not limited in the present invention.

When the movement distance of the remote controller in the first movement direction is larger than or equal to the first preset movement distance, and the movement time is shorter than the first preset movement time, and at the same time, the operation residence time of the user at the movement end position is longer than the second time threshold, the first length is larger than or equal to the first preset length, and the second length is larger than or equal to the second preset length, it is determined that the operation gesture is the gesture of holding after covering and rotating, where the first movement direction (that is, the annular direction) is parallel to the circumferential direction of the ring body.

By using the foregoing operation gestures, the user can control the terminal device to execute different operations, and the different operations executed by the terminal device may be set according to an actual situation. When the user controls progress of a television program using the remote controller, assuming that multiple icons are displayed on a screen of a television set, the user may select an icon by sliding on the touch pad using the slide gesture. A cursor on the television set moves on the multiple icons along with the slide gesture. When the slide gesture stops, the icon on which the cursor stays is a selected icon. Then, the user may open the icon by staying at any position on the touch pad using the gesture of touching and holding. It is assumed that when the user taps any point on the touch pad using the tap gesture, it may indicate to start to play a video; when the users taps any point on the touch pad again, it may indicate to pause playback of the video; and when the user holds the remote controller using the gesture of covering, it may indicate to start to operate content of the video. When the user controls, using the remote controller, a mobile phone to browse a microblog, the user may trigger, using the gesture of covering and rotating, the microblog on a screen of the mobile phone to roll down; and after several posts are rolled, the microblog stops rolling when the gesture of covering and rotating stops. The user may also trigger, using the gesture of holding after covering and rotating, the microblog on the screen of the mobile phone to roll down; during holding, the microblog keeps rolling; and only when the user releases the hand to stop the holding does the microblog gradually stop. The user may further perform volume adjustment and so on using the sliding gesture, which is not limited in the present invention.

Figure 9:
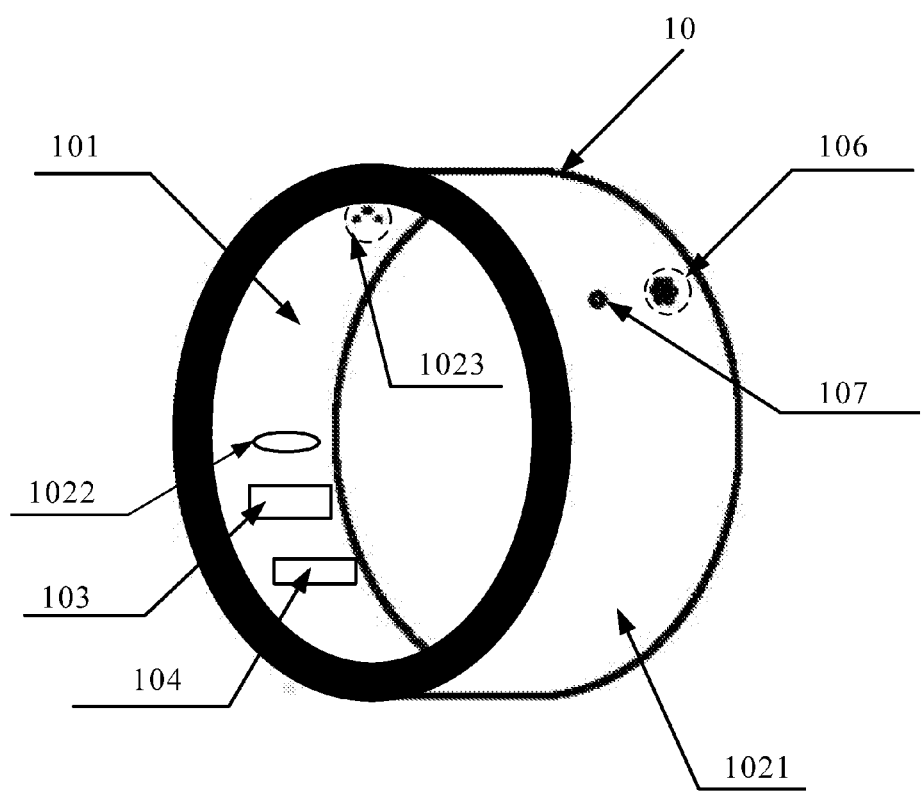
FIG. 9 is another schematic structural diagram of a remote controller according to an embodiment of the present invention.
Figure 10:
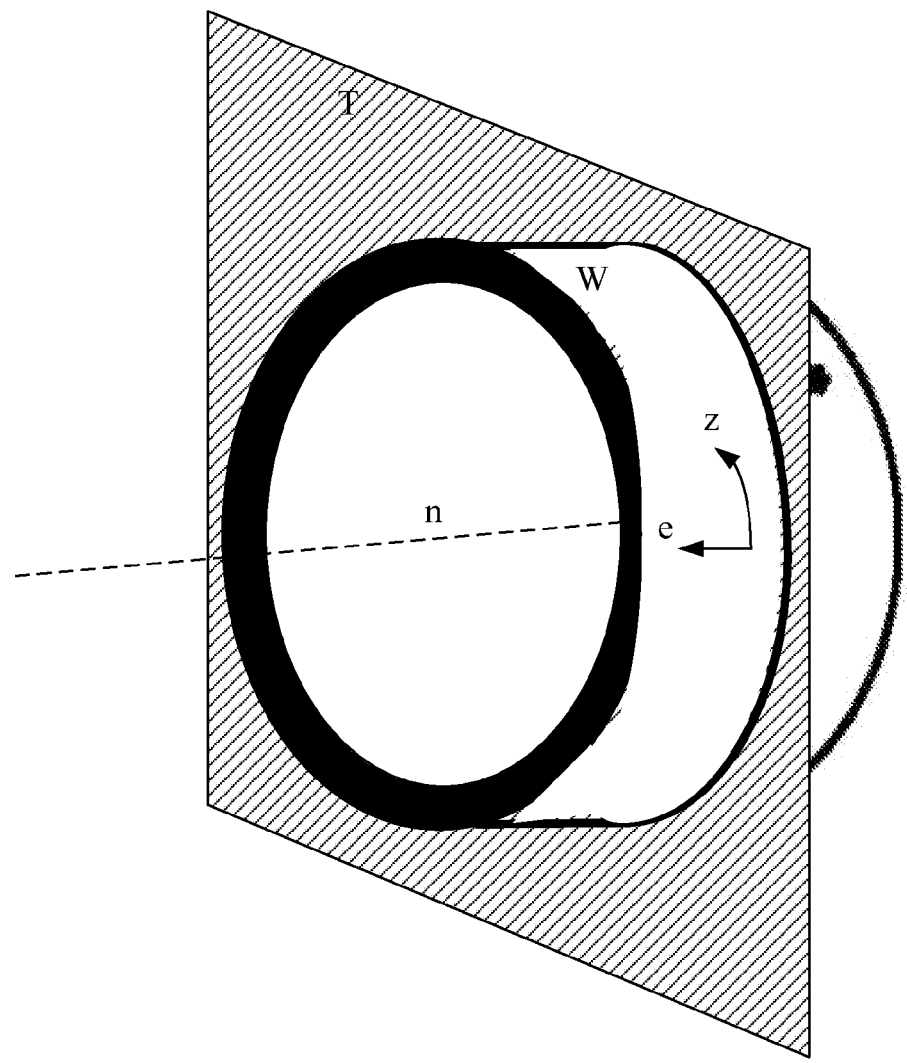
FIG. 10 is still another schematic structural diagram of a remote controller according to an embodiment of the present invention.

It should be noted that, as shown in FIG. 9, the first sensor 1023 is further configured to send the movement direction and the movement distance in the movement direction to the processor 103, so that the processor 103 determines, according to the movement direction and the movement distance in the movement direction, whether the remote controller 10 moves or not. The remote controller 10 may move in multiple cases, where movement includes rotation movement and translation movement, and therefore movement needs to be determined by the processor 103. Further, the processor 103 may determine, when the movement distance of the remote controller 10 in the first movement direction is smaller than the first preset movement distance and the movement distance in the second movement direction is smaller than the second preset movement distance, that the remote controller 10 does not move; and determine, when the movement distance is than or equal to the first preset movement distance and the movement direction is the first movement direction, that the rotation movement occurs on the remote controller 10. As shown in FIG. 10, the first movement direction (that is, the annular direction) may be parallel to the circumferential direction of the ring body, for example, a direction of an arrow z, where the arrow z is a curved arrow. When the user applies a force to the remote controller in the first movement direction, the remote controller may rotate around an axial line n. When the movement distance is larger than or equal to the second preset movement distance, and the movement direction is the second movement direction, it is determined that the translation movement occurs on the remote controller. As shown in FIG. 10, particularly, the first movement direction (that is, the annular direction) may also be a direction that is parallel to a tangential direction of an annular axis section T (which is perpendicular to the axial line n). At this time, the movement distance in the first movement direction is a projection value, in the first movement direction, of an actual movement distance on an outer surface W of the remote control main body. The second movement direction (that is, the axial direction) may be parallel to a direction of the axial line n, for example, a direction of an arrow e. When the user applies a force to the remote controller in the second movement direction, the remote controller performs translation in the direction parallel to the axial line n. It should be noted that, in an actual application, included angles may exist between the movement direction obtained by measurement by the first sensor 1023 and the first movement direction and between the movement direction and the second movement direction. When the included angle between the movement direction and the first movement direction is within a preset included angle range, it may be considered that the movement direction is the first movement direction. When the included angle between the movement direction and the second movement direction is within the preset included angle range, it may be considered that the movement direction is the second movement direction. The preset included angle is generally an angle smaller than 45 degrees.

The remote controller 10 may further include a microphone 106, where the microphone 106 is located on the outer surface of the remote control main body 101 (not shown), and is configured to receive an external voice input; a loudspeaker (not shown in the figure), where the loudspeaker is located on the outer surface of the remote control main body 101, and is configured to output a prompt tone; if there is no loudspeaker in the remote controller 10, the prompt tone may be output using a loudspeaker of the terminal device 20; an indicator light 107, where the indicator light 107 is located on the outer surface of the remote control main body 101, and is configured to provide indication signals of different colors for the user.

Figure 11:
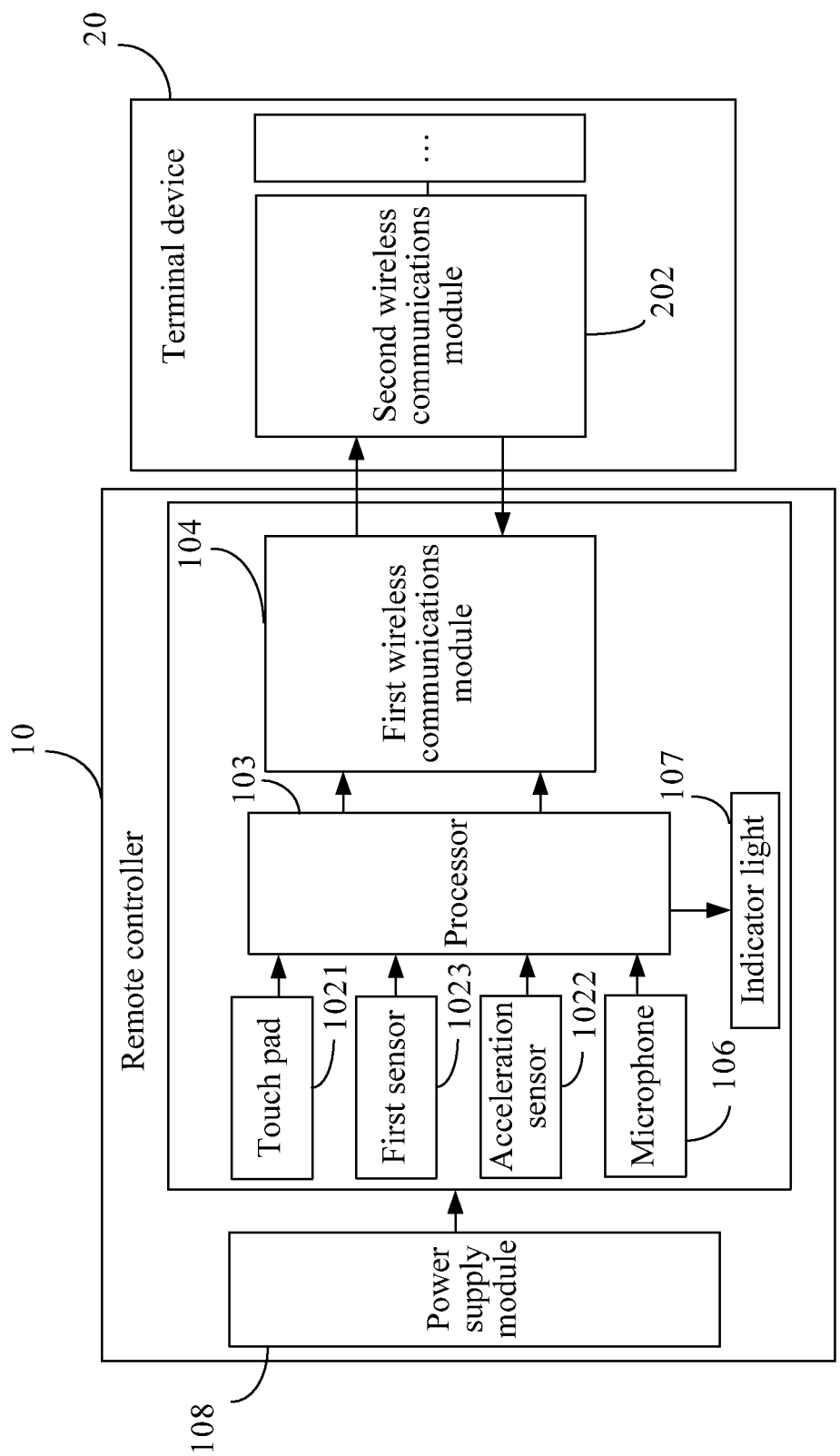
FIG. 11 is a schematic diagram of connection manners between modules in a remote controller according to an embodiment of the present invention.

Particularly, the remote controller 10 further includes a power supply module 108 configured to provide power to modules in the remote controller 10. In the embodiment of the present invention, the sensor 102 (not shown) may include the touch pad 1021, the acceleration sensor 1022, and the first sensor 1023, where connection manners between modules in the remote controller 10 is shown in FIG. 11; and the processor 103, the first wireless communications module 104, the touch pad 1021, the acceleration sensor 1022, the first sensor 1023, the microphone 106, and the indicator light 107 are all located on the remote control main body 101. The power supply module 108 is connected to the modules in the remote controller 10, and is configured to provide power to the modules. The touch pad 1021, the first sensor 1023, the acceleration sensor 1022, the microphone 106, the first wireless communications module 104, and the indicator light 107 are separately connected to the processor 103, where the touch pad 1021 provides, for the processor 103, a signal generated by a touch gesture in the operation gestures, the first sensor 1023 provides the movement direction of the remote controller 10 and the movement distance in the movement direction for the processor 103, and the acceleration sensor 1022 provides an acceleration signal for the processor 103; the processor 103 may perform determining according to the foregoing signals to obtain a corresponding operation gesture, generate, according to the operation gesture, a control signal indicating the operation gesture, or generate a control signal that carries a response instruction, and transmit the control signal to the first wireless communications module 104; the first wireless communications module 104 sends the control signal to a second wireless communications module 202 of the terminal device 20, and the second wireless communications module 202 transmits the control signal to a corresponding module of the terminal device 20, so that the terminal device 20 executes the instruction indicated by the control signal; and then the second wireless communications module 202 returns a feedback signal to the first wireless communications module 104, the first wireless communications module 104 transmits the feedback signal to the processor 103, and the processor 103 instructs the indicator light 107 to display a specific indication signal according to the feedback signal.

The user may also control, using different actions, the terminal device to execute different operations, and the different operations executed by the terminal device may be set according to an actual situation. The user may control playback of music by shaking the remote controller; when the user shakes the remote controller once for the first time, it may indicate to start to play the music randomly; when the user shakes the remote controller once again, it may indicate to stop playing the music; when the user shakes the remote controller twice, it may indicate to play a next song; when the user shakes the remote controller thrice, it may indicate to play a previous song; the user may also control playback progress of a video or an image by blowing the microphone; and so on. On the remote controller provided by the embodiment of the present invention, the user can control, using the operation gestures and different body actions, the terminal device to execute different operations, which provides multiple control manners for the user for selection, thereby improving the user experience.

It should be noted that, the distance in the embodiment of the present invention not only may be a distance on a curved surface, but also may be a linear distance, which is not limited in the present invention.

For the remote controller provided by the embodiment of the present invention, because the remote control main body is a wearable ring body, the remote controller can be worn on the body of a user; moreover, the user controls, by inputting an operation gesture to the sensor, the remote controller to send a control signal to a terminal device, and no pushbutton operation is required; in addition, by updating an operation instruction table, the remote controller can control multiple terminal devices, and provide multiple control manners on a terminal device for selection. Therefore, the remote controller can improve the user experience and is easy to carry.

Figure 12:
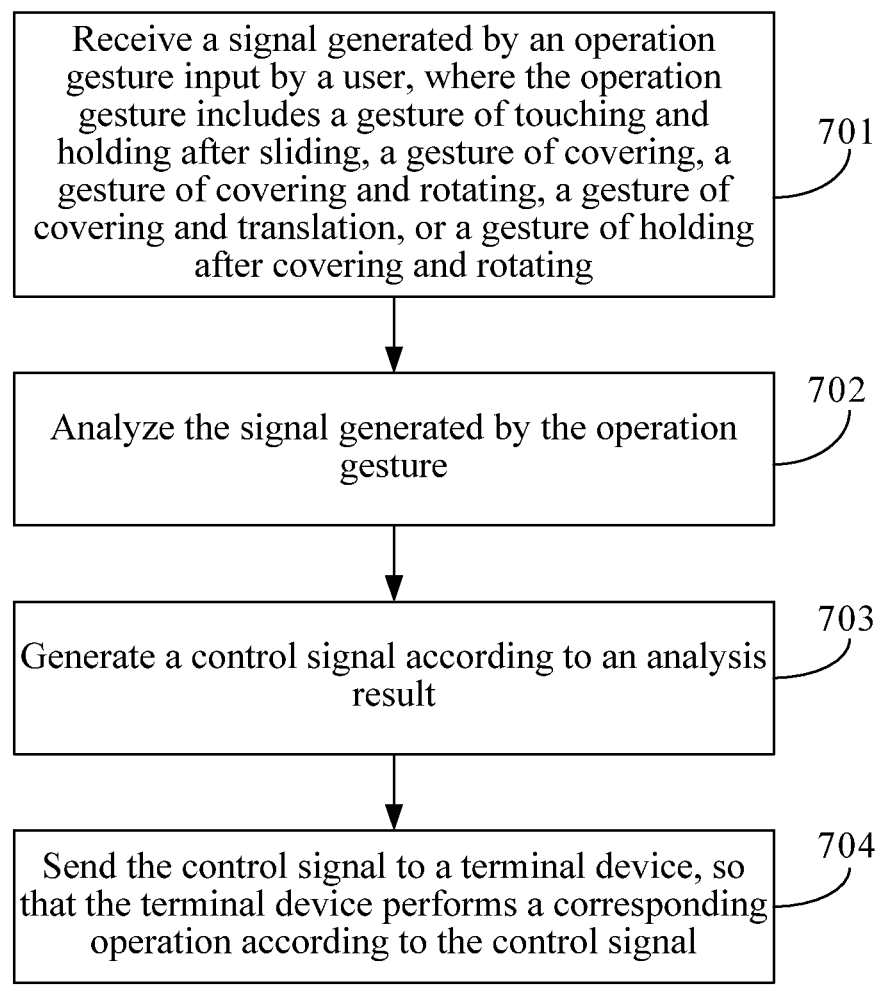
FIG. 12 is a flowchart of an information processing method according to an embodiment of the present invention.

As shown in FIG. 12, an embodiment of the present invention provides an information processing method, which is applied to the remote controller, and includes the following steps:

Step 701: Receive a signal generated by an operation gesture input by a user, where the operation gesture includes a gesture of touching and holding after sliding, a gesture of covering, a gesture of covering and rotating, a gesture of covering and translation, or a gesture of holding after covering and rotating.

Step 702: Analyze the signal generated by the operation gesture.

Step 703: Generate a control signal according to an analysis result.

Step 704: Send the control signal to a terminal device, so that the terminal device performs a corresponding operation according to the control signal.

In this way, the user controls, using the operation gesture, the remote controller to send the control signal to the terminal device, and no pushbutton operation is required. Therefore, user experience can be improved.

It should be noted that, before step 701, a pairing action may further be first performed, which comprises receiving an operation gesture indicating pairing; activating a first NFC module of the remote controller; within a preset time threshold, when a distance between the first NFC module and a second NFC module of the terminal device is shortened to be within a specific distance range, establishing, by the first NFC module, a connection to and communicating with the second NFC module; and establishing a connection between a first wireless communications module of the remote controller and a second wireless communications module of the terminal device by means of communication between the first NFC module and the second NFC module, that is, establishing a wireless connection between the first wireless communications module 104 and the second wireless communications module 202. The connection between the first wireless communications module of the remote controller and the second wireless communications module of the terminal device is a WIFI or Bluetooth connection.

It should be noted that, after the establishing a connection between a first wireless communications module of the remote controller and a second wireless communications module of the terminal device by means of communication between the first NFC module and the second NFC module, the method may further include sending a first operation instruction table to the terminal device, so that the terminal device updates an operation instruction table in the terminal device according to the first operation instruction table, where the first operation instruction table records relationships between operation gestures and response instructions; and the sending the control signal to a terminal device, so that the terminal device performs a corresponding operation according to the control signal includes sending the control signal indicating the operation gesture to the terminal device, so that the terminal device queries the first operation instruction table according to the operation gesture indicated by the control signal, and executes a corresponding response instruction according to a query result.

After the establishing a connection between a first wireless communications module of the remote controller and a second wireless communications module of the terminal device by means of communication between the first NFC module and the second NFC module, the method further includes receiving a second operation instruction table sent by the second wireless communications module of the terminal device; updating an operation instruction table in the remote controller according to the second operation instruction table, where the second operation instruction table records relationships between control signals and response instructions; and the sending the control signal to a terminal device, so that the terminal device performs a corresponding operation according to the control signal includes sending the control signal that carries the response instruction to the terminal device, so that the terminal device executes the response instruction carried in the control signal.

Further, the analyzing the operation gesture may include receiving touch point information reported by the touch pad, where touch points are continuous; recording start position coordinates and end position coordinates of the operation gesture; recording an operation residence time of the user at the end position coordinates; and when a distance between the start position coordinates and the end position coordinates is larger than or equal to a first preset distance, and the operation residence time is longer than or equal to a first time threshold, determining that the operation gesture is the gesture of touching and holding after sliding.

The analyzing the operation gesture may further include obtaining a touch area reported by the touch pad and generated by a user operation; obtaining a spacing between two points, between which an annular distance is the largest, in the touch area as a first length; obtaining a spacing between two points, between which an axial distance is the largest, in the touch area as a second length; and determining whether the remote controller moves or not, where movement includes rotation movement and translation movement. When a movement distance of the remote controller in a first movement direction (that is, an annular direction) is smaller than a first preset movement distance and a movement distance of the remote controller in a second movement direction (that is, an axial direction) is smaller than a second preset movement distance, it is determined that the remote controller does not move; when the movement distance is larger than or equal to the first preset movement distance and the movement direction is the first movement direction, it is determined that that rotation movement occurs on the remote controller; and when the movement distance is larger than or equal to the second preset movement distance and the movement direction is the second movement direction, it is determined that that translation movement occurs on the remote controller.

When the movement distance of the remote controller in the first movement direction is smaller than the first preset movement distance and the movement distance in the second movement direction is smaller than the second preset movement distance, and the first length is larger than or equal to a first preset length and the second length is larger than or equal to a second preset length, it is determined that the operation gesture is the gesture of covering, where the first movement direction is parallel to a circumferential direction of the ring body, and the second movement direction is parallel to an axis direction of the remote control main body.

When the movement distance of the remote controller in the first movement direction is larger than or equal to the first preset movement distance, the movement direction is the first movement direction, and a movement time is shorter than a first preset movement time, and at the same time, an operation residence time of the user at a movement end position is shorter than or equal to a second time threshold, the first length is larger than or equal to the first preset length, and the second length is larger than or equal to the second preset length, it is determined that the operation gesture is the gesture of covering and rotating, where the first movement direction is parallel to the circumferential direction of the ring body.

When the movement distance of the remote controller in the second movement direction is larger than or equal to the second preset movement distance, the movement direction is the second movement direction, and the movement time is shorter than a second preset movement time, and at the same time, the operation residence time of the user at the movement end position is shorter than or equal to the second time threshold, the first length is larger than or equal to the first preset length, and the second length is larger than or equal to the second preset length, it is determined that the operation gesture is the gesture of covering and translation, where the second movement direction is parallel to the axis direction of the remote control main body.

When the movement distance of the remote controller in the first movement direction is larger than or equal to the first preset movement distance, the movement direction is the first movement direction, and the movement time is shorter than the first preset movement time, and at the same time, the operation residence time of the user at the movement end position is longer than the second time threshold, the first length is larger than or equal to the first preset length, and the second length is larger than or equal to the second preset length, it is determined that the operation gesture is the gesture of holding after covering and rotating, where the first movement direction is parallel to the circumferential direction of the ring body.

A person skilled in the art may clearly understand that, for the purpose of convenient and brief description, for specific steps of the foregoing method, reference may be made to a corresponding process in the foregoing remote controller embodiment, and details are not described herein again.

In the information processing method provided by the embodiment of the present invention, a user controls, by inputting an operation gesture, a remote controller to send a control signal to a terminal device; operations for the operation gesture involve small-amplitude actions, are the same as or similar to existing gesture operations, and are easy to learn; the user controls the terminal device using a simple operation gesture only without pressing different pushbuttons, and neither a pushbutton operation nor a large-amplitude hand action is required; and the remote controller can control multiple terminal devices. Therefore, the user experience can be improved.

An information processing system in an embodiment of the present invention includes a remote controller provided by any embodiment of the present invention and a terminal device, where the terminal device is configured to perform a corresponding operation according to a control instruction sent by the remote controller.

The terminal device may be a mobile phone, a television set, or a computer, and so on.

In the several embodiments provided in the present invention, it should be understood that the disclosed system, apparatus, and method may be implemented in other manners. For example, the described apparatus embodiment is merely schematic. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. A part or all of the units may be selected according to an actual need to achieve objectives of solutions of the embodiments.

In addition, functional units in the embodiments of the present invention may be integrated into one processing unit, or each of the units may exist alone physically, or two or more units are integrated into one unit. The integrated unit may be implemented in a form of hardware, or may also be implemented in a form of hardware plus a software functional unit.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A remote controller comprising:
   a remote control main body, wherein the remote control main body is a wearable ring body;
   a touch pad configured to receive a touch gesture input by a user;
   a sensor configured to detect a movement direction and a movement distance in the movement direction when the remote controller moves;
   a processor coupled to the touch pad and the sensor, wherein the processor is configured to:
      obtain a touch area detected by the touch pad and generated by the touch gesture;
      obtain a spacing between two points, between which an annular distance is the largest, in the touch area as a first length;
      obtain a spacing between two points, between which an axial distance is the largest, in the touch area as a second length;
      determine, when the remote controller moves, an operation gesture is a gesture of covering and rotating when a movement distance of the remote controller in a first movement direction is larger than or equal to a first preset movement distance, a movement time is shorter than a first preset movement time, an operation residence time of the user at a movement end position is shorter than or equal to a second time threshold, the first length is larger than or equal to a first preset length, and the second length is larger than or equal to a second preset length, wherein the first movement direction is parallel to a circumferential direction of the ring body; and
      generate a control signal according to the gesture of covering and rotating; and
   a first wireless transceiver coupled to the processor and configured to send the control signal to a terminal device so that the terminal device performs a corresponding operation according to the control signal.

2. The remote controller according to claim 1, wherein the first wireless transceiver is configured to establish a connection between the first wireless transceiver of the remote controller and a second wireless transceiver of the terminal device, and wherein the connection between the first wireless transceiver of the remote controller and the second wireless transceiver of the terminal device is a WiFi or Bluetooth connection.

3. The remote controller according to claim 2, wherein the first wireless transceiver is further configured to receive a second operation instruction table sent by the second wireless transceiver, wherein the first wireless transceiver is further configured to update an operation instruction table in the remote controller according to the second operation instruction table, wherein the second operation instruction table records relationships between control signals and response instructions, wherein the processor is configured to:
   query the second operation instruction table according to the operation gesture; and
   generate a control signal that carries a response instruction corresponding to the operation gesture, and
   wherein the first wireless transceiver is configured to send the control signal to the terminal device so that the terminal device executes the response instruction carried in the control signal.

4. The remote controller according to claim 2, wherein the first wireless transceiver is further configured to send a first operation instruction table to the second wireless transceiver so that the terminal device updates an operation instruction table in the terminal device according to the first operation instruction table, wherein the first operation instruction table records relationships between operation gestures and response instructions, wherein the processor is further configured to generate a control signal indicating the gesture of covering and rotating, and wherein the first wireless transceiver is further configured to send the control signal to the terminal device so that the terminal device:

queries the first operation instruction table according to the gesture of covering and rotating indicated by the control signal; and executes, according to a query result, a response instruction corresponding to the gesture of covering and rotating.

5. An information processing method, applied to a remote controller, the method comprising:

receiving, by a touch pad of the remote controller, a touch gesture input by a user;

obtaining a touch area detected by the touch pad and generated by the touch gesture;

obtaining a spacing between two points, between which an annular distance is the largest, in the touch area as a first length;

obtaining a spacing between two points, between which an axial distance is the largest, in the touch area as a second length;

detecting a movement direction and a movement distance in the movement direction when the remote controller moves;

determining, when the remote controller moves, an operation gesture is a gesture of covering and rotating when a movement distance of the remote controller in a first movement direction is larger than or equal to a first preset movement distance, and a movement time is shorter than a first preset movement time, an operation residence time of the user at a movement end position is shorter than or equal to a second time threshold, the first length is larger than or equal to a first preset length, and the second length is larger than or equal to a second preset length, wherein the first movement direction is parallel to a circumferential direction of a ring body of the remote controller;

generating a control signal according to the gesture of covering and rotating; and sending the control signal to a terminal device so that the terminal device performs a corresponding operation according to the control signal.

6. The information processing method according to claim 5, wherein before receiving the touch gesture input by the user, the method further comprises establishing a connection between a first wireless transceiver of the remote controller and a second wireless transceiver of the terminal device, and wherein the connection between the first wireless transceiver of the remote controller and the second wireless transceiver of the terminal device is a WiFi or Bluetooth connection.

7. The information processing method according to claim 6, wherein after establishing the connection between the first wireless transceiver of the remote controller and the second wireless transceiver of the terminal device, the method further comprises:

receiving a second operation instruction table sent by the second wireless transceiver; and updating an operation instruction table in the remote controller according to the second operation instruction table, wherein the second operation instruction table records relationships between control signals and response instructions, and wherein sending the control signal to the terminal device so that the terminal device performs the corresponding operation according to the control signal comprises sending the control signal to the terminal device so that the terminal device executes the response instruction carried in the control signal.

8. The information processing method according to claim 6, wherein the control signal comprises the operation gesture, wherein after establishing the connection between the first wireless transceiver of the remote controller and the second wireless transceiver of the terminal device, the method further comprises sending a first operation instruction table to the terminal device, so that the terminal device updates an operation instruction table in the terminal device according to the first operation instruction table, wherein the first operation instruction table records relationships between operation gestures and response instructions, and wherein sending the control signal to the terminal device so that the terminal device performs the corresponding operation according to the control signal comprises sending the control signal to the terminal device so that the terminal device:

queries the first operation instruction table according to the gesture of covering and rotating indicated by the control signal; and executes a corresponding response instruction according to a query result.

* * * * *

UNITED STATES PATENT AND TRADEMARK OFFICE
CERTIFICATE OF CORRECTION

PATENT NO. : 9,978,261 B2  
APPLICATION NO. : 14/493520  
DATED : May 22, 2018  
INVENTOR(S) : Lifu Xu et al.

Page 1 of 1

It is certified that error appears in the above-identified patent and that said Letters Patent is hereby corrected as shown below:

Page 2, Column 1, Line 8, under Foreign Patent Documents should read:  
CN 103116973 A 5/2013

Signed and Sealed this  
Third Day of July, 2018

Andrei Iancu  
*Director of the United States Patent and Trademark Office*